(12) United States Patent
Matsuno et al.

(10) Patent No.: US 6,671,918 B2
(45) Date of Patent: Jan. 6, 2004

(54) SUBSTRATE CLEANING APPARATUS

(75) Inventors: Tomofumi Matsuno, Tenri (JP); Mitsuo Uemura, Tenri (JP); Kazuya Yoshimura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 276 days.

(21) Appl. No.: 09/881,399

(22) Filed: Jun. 14, 2001

(65) Prior Publication Data
US 2001/0054210 A1 Dec. 27, 2001

(30) Foreign Application Priority Data

Jun. 15, 2000 (JP) .................................... 2000-179474
Apr. 16, 2001 (JP) .................................... 2001-116483

(51) Int. Cl.[7] ............................................. B08B 11/00
(52) U.S. Cl. ........................ 15/102; 15/21.1; 15/256.5
(58) Field of Search ............................. 15/102, 256.5, 15/21.1

(56) References Cited

U.S. PATENT DOCUMENTS

| | | | | |
|---|---|---|---|---|
| 4,982,469 A | * | 1/1991 | Nishiwaki | |
| 5,699,584 A | * | 12/1997 | Wieloch | |
| 5,943,725 A | * | 8/1999 | Wandres | |
| 5,991,954 A | * | 11/1999 | Kubota | |
| 5,991,963 A | * | 11/1999 | Tourigny | |
| 6,101,656 A | * | 8/2000 | Lee | |
| 6,128,464 A | * | 10/2000 | Taniguchi | |
| 2001/0052159 A1 | * | 12/2001 | Moinpour | |

FOREIGN PATENT DOCUMENTS

| | | |
|---|---|---|
| JP | 5-16127 | 3/1993 |
| JP | 5-228449 | 9/1993 |
| JP | 8-10719 | 1/1996 |
| JP | 8-10736 | 1/1996 |
| JP | 08220517 | 8/1996 |
| JP | 10039282 | 2/1998 |
| JP | 10-197853 | 7/1998 |
| TW | 055128 | 12/1983 |
| TW | 317538 | 10/1997 |

* cited by examiner

Primary Examiner—Randall E. Chin
(74) Attorney, Agent, or Firm—David C. Conlin; David A. Tucker; Edwards & Angell, LLP

(57) ABSTRACT

A substrate cleaning apparatus of the present invention includes one sheet roll wound with one end of a polishing sheet that is arranged to be in contact with the surface of a liquid crystal panel, and the other sheet roll for rolling up the polishing sheet from the other end. The substrate cleaning apparatus further includes a rotating unit provided with a motor, a belt, and a rotation shaft for rotating the polishing sheet and the pair of sheet rolls with respect to the liquid crystal panel. Thus, the substrate cleaning apparatus can be provided which is capable of reducing an operation time required for removing foreign matters, enhancing operation efficiency, stably and reliably removing foreign matters, and restraining operation time even if the size of the substrate increases.

4 Claims, 5 Drawing Sheets

SUBSTRATE CLEANING APPARATUS

BACKGROUND OF THE INVENTION

1. Field of the Invention

The present invention relates to substrate cleaning apparatuses and, more specifically to a cleaning apparatus adapted to efficiently and stably provide automatic removal of foreign matters adhering to the surface of a liquid crystal panel, such as cullets and sealing resin.

2. Description of the Background Art

In manufacturing a liquid crystal panel, two glass plates are bonded, the bonded glass plates are cut to have a prescribed size, a liquid crystal is transferred between the bonded and cut glass plates, and deflection plates are bonded on both surfaces of the bonded glass plates.

In the process of manufacturing a liquid crystal panel, when cutting the bonded glass plates to have a prescribed size, cullets (powder or small fragments of glass) produced by the cutting step may stick (in a solid state) to the surface of the glass plate, or a sealant may stick to the glass surface around a sealant transferring portion when sealing the sealant transferring portion after the liquid crystal is transferred between two glass plates.

Because of such foreign matters, i.e., cullets and sealing resin, sticking to the surface of the glass plates in the manufacturing process of the liquid crystal panel, the next step of bonding deflection plates would not be properly performed. Thus, these foreign matters have to be removed.

In a conventional method of removing the above mentioned foreign matters, a liquid crystal panel placed in water is set on a cleaning stage that is sprinkled with water, and a cleaning tool provided with a polishing sheet is soaked with water. The cleaning tool is manually held for manual polishing of the liquid crystal panel set on the cleaning stage.

After the cleaning step, the liquid crystal panel is passed through a brush rotating in a cleaning tank that is sprinkled with water by a cleaning apparatus. In this way, dusts, water scale and so on that are relatively weakly adhering to the surface of the liquid crystal panel are removed. Thereafter, the liquid crystal panel is dried out after being passed through an air knife.

After the liquid crystal panel is passed through the cleaning apparatus, the surface thereof is visually inspected, and remaining foreign matters are removed by a cutter or a cloth soaked with a solvent.

Methods of removing foreign matters on the panel surface include a cutter blade rotation method and sheet-rotation polishing method, in addition to manual cleaning.

In the cutter blade rotation method, at least two blades are provided, which are subjected to rotation and revolution and brought into contact with the liquid crystal panel so as to scrape off the foreign matters.

In the sheet-rotation polishing method, a stage provided with a sheet is rotated, and an object to be cleaned is brought into contact with the stage from above, for polishing on the rotating stage.

The feeding and rotation of a polishing tape allow the object to be constantly kept in contact with a new portion of polishing tape.

However, the above described conventional methods of cleaning the liquid crystal panel, including manual cleaning, cutter rotation method and sheet rotation method, suffer from the following problems.

The manual cleaning is accompanied by a considerable variation in workability and considerable loss time. In addition, as liquid crystal panels increase in size, instability in removing foreign matters become conspicuous and a loss time increases.

In the cutter rotation method, scratches are likely to be caused over the surface of the object. In addition, there is a variation in cleaning capability depending on a precision associated with, e.g., surface undulation of the object and the like, whereby a stable removing effect cannot be produced.

In the sheet-rotation polishing method, the size of an object is limited. Thus, it is difficult to increase the size of the object, and a sheet consumption is extremely high. In addition, pressure control is difficult during polishing, polishing unevenness is likely to be caused, and foreign matters adhering to the sheet may cause scratches.

SUMMARY OF THE INVENTION

One object of the present invention is to provide a substrate cleaning apparatus capable of enhancing operation efficiency with reduced operation time for removal of foreign matters, stably removing foreign matters, providing a high-quality substrate without causing a problem of foreign matters, and cleaning a greater-sized substrate.

A substrate cleaning apparatus of the present invention is adapted to remove foreign matters on a substrate surface and is provided with a sheet, roll, and rotating unit. The sheet is arranged to be in contact with the substrate surface. The sheet is wound on the roll. The rotating unit rotates the rolls wound with the sheet with respect to the substrate.

The substrate cleaning apparatus of the present invention automatically rotates the sheet by the rotating unit for cleaning the substrate surface. Thus, unlike the conventional manual cleaning, the foreign matters can be removed with less loss time and operation time, efficiency of the removal operation is enhanced, more stable cleaning is provided, and the foreign matters can be reliably removed.

In addition, the rolls enable automatic feeding of the sheet. Thus, cleaning can always be performed with a new portion of sheet, whereby an operation loss would not be caused in feeding the sheet.

In the above described substrate cleaning apparatus, preferably, the sheet is adapted to be brought into line contact with the substrate surface.

The rotation of the sheet in line contact with the substrate surface allows the foreign matters on the substrate surface to be scraped off the substrate surface, and the foreign matters would not be caught between the sheet and substrate.

In the substrate cleaning apparatus, preferably, a sheet supporting member is further provided which is in line contact with the sheet surface opposite the substrate. The sheet supporting member is rotatively supported to incline a portion that is in line contact with the sheet.

The rotation of the sheet supporting member allows the sheet to be rotated closely in line contact with the substrate surface even if the substrate surface is inclined. Thus, the substrate and sheet are reliably and stably kept in contact during rotation, avoiding the problem of precision or undulation of the substrate surface. Further, cleaning efficiency is enhanced, the foreign matters would not be caught between the liquid crystal panel and sheet or drawn over the surface, scratches would not be caused over the substrate surface, and re-adhesion of the foreign matters to the substrate surface is prevented.

In the substrate cleaning apparatus, preferably, a pressure adjusting unit for measuring a pressure applied to press the sheet against the substrate and adjusting the pressure is provided.

Thus, the sheet can be pressed against the substrate surface with an appropriate and stable pressure, whereby cleaning effect is enhanced and cleaning capability is stabilized. In addition, cell gap unevenness over the substrate is prevented.

In the substrate cleaning apparatus, preferably, the substrate is a liquid crystal panel.

As described above, the substrate cleaning apparatus of the present invention is particularly suitable for cleaning the surface of the liquid crystal panel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, an embodiment of the present invention will be described with reference to the drawings.

Figure 1:
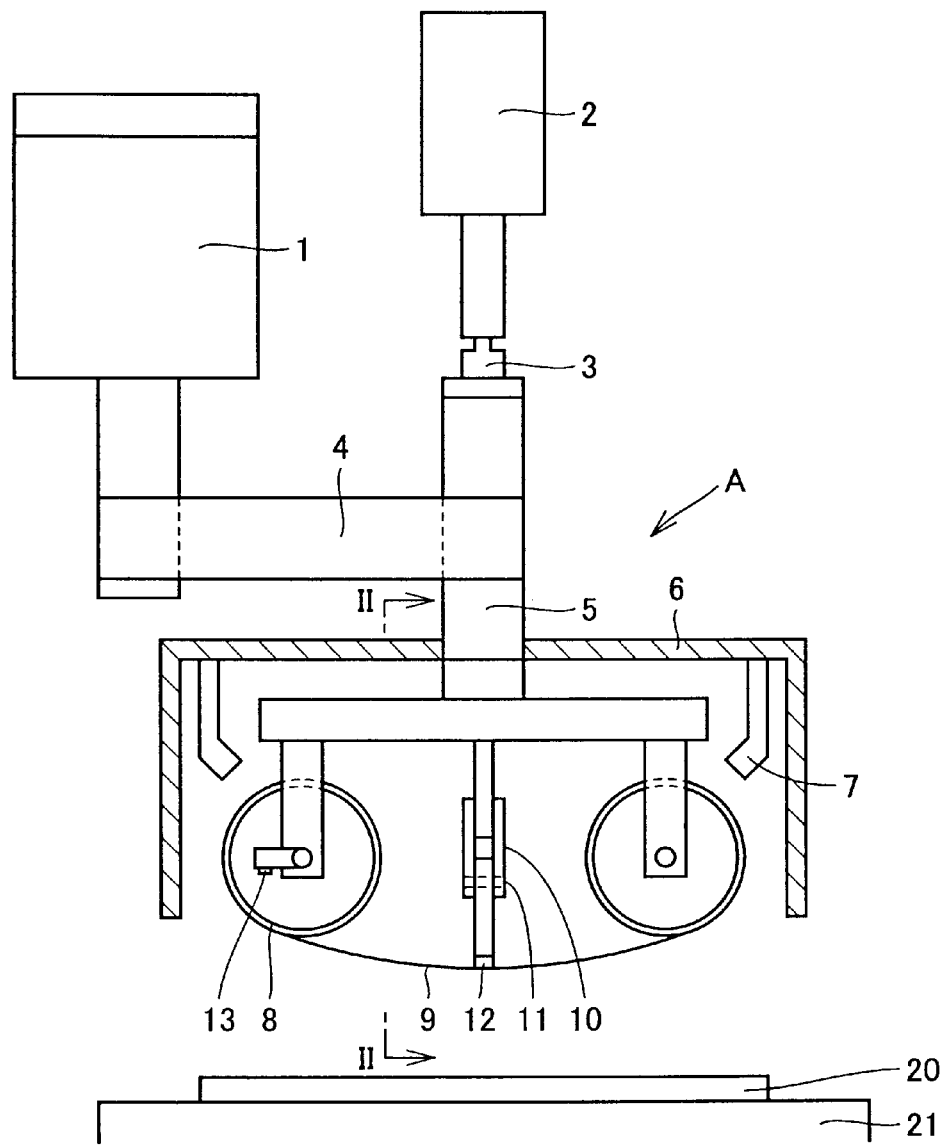
FIG. 1 is a cross sectional view schematically showing a structure of a rotating unit for a liquid crystal panel cleaning apparatus according to one embodiment of the present invention.

Referring to FIG. 1, a rotating unit A is adapted to clean the surface of a liquid crystal panel 20 set on a stage 21. Rotating unit A mainly includes a motor 1, cylinder 2, load cell 3, belt 4, rotation shaft 5, water-scattering preventing cover 6, sprinkling nozzle 7, a pair of sheet rolls 8, a polishing sheet 9, sheet backup 12, and mechanism 13 for automatically feeding sheet.

Motor 1 is arranged to provide a driving force to rotation shaft 5 via belt 4. Motor 1, belt 4 and rotation shaft 5, therefore together form the drive system for rotating unit A. Alternatively, a gear may be provided on the rotation shaft 5 that is driven by a corresponding gear on the motor shaft. Rotation shaft 5 is connected to cylinder 2 via load cell 3. Load cell 3 is used for measuring the pressure applied against the surface of liquid crystal panel 20 by polishing sheet 9. The pressure is appropriately adjusted by cylinder 2 based on the measurement value. An example of another pressure exerting method includes directly connecting a motor to a substantially vertically disposed (i.e., Z axis when the X and Y axes lie in the horizontal plane) shaft of the rotating unit A for pressure application.

A pair of cylinder-like sheet rolls 8 are supported by rotation shaft 5 for respective rotation about its longitudinal axis. One end of polishing sheet 9 is wound on one sheet roll 8, and the other end of polishing sheet 9 is adapted to be wound on the other sheet roll 8.

Sheet backup 12 is in line contact with polishing sheet 9 and supported by swing mechanism 10.

Figure 2:
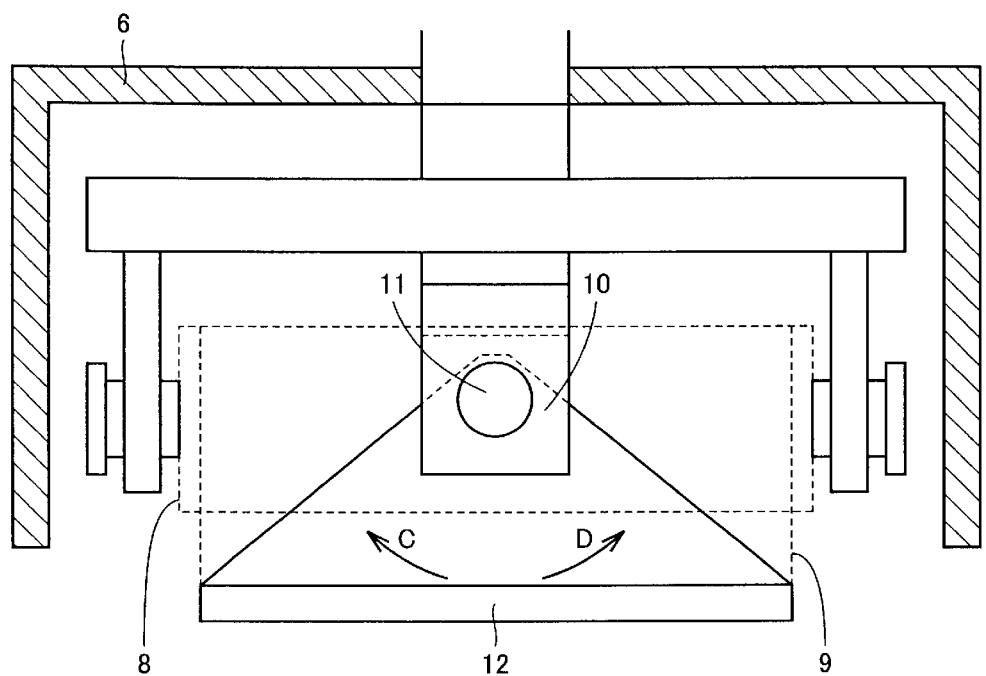
FIG. 2 is a schematic cross sectional view taken along the line II—II of FIG. 1, showing the structure a swing mechanism.

As shown in FIG. 2, swing mechanism 10 includes sheet backup 12 supported rotatively about a bearing shaft 11 in the C direction (clockwise) and the D direction (counterclockwise, as indicated by arrows. The rotation of sheet backup 12 allows the portion thereof that is in line contact with the polishing sheet 9 to incline relative to the horizontal.

Referring to FIG. 1, water-scattering preventing cover 6 is supported by rotation shaft 5 and provided with sprinkling nozzle 7 for sprinkling water during the cleaning operation. Water-scattering preventing cover 6 serves to prevent water sprinkled by sprinkling nozzle 7 from scattering about.

Figure 3:
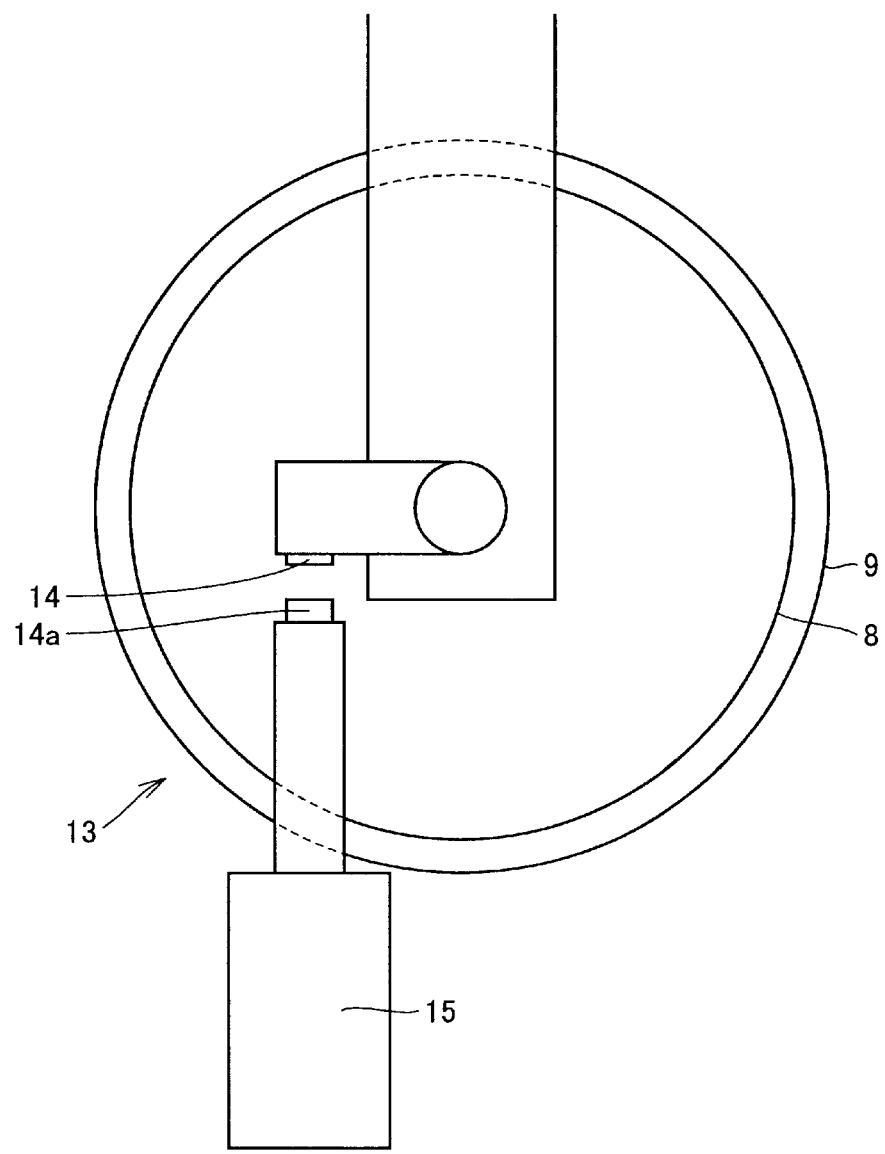
FIG. 3 is a diagram showing in enlargement a mechanism for automatically feeding a polishing sheet in the rotating unit of FIG. 1.

As shown in FIG. 3, a projection 14 is provided adjacent to an end of the sheet roll 8 upon which the polishing sheet is wound. A projection 14a is connected to cylinder 15 to be opposite projection 14. These projections 14, 14a and cylinder 15 form mechanism 13 for automatically feeding the sheet.

Now, a moving mechanism of the rotating unit will be described.

Figure 4:
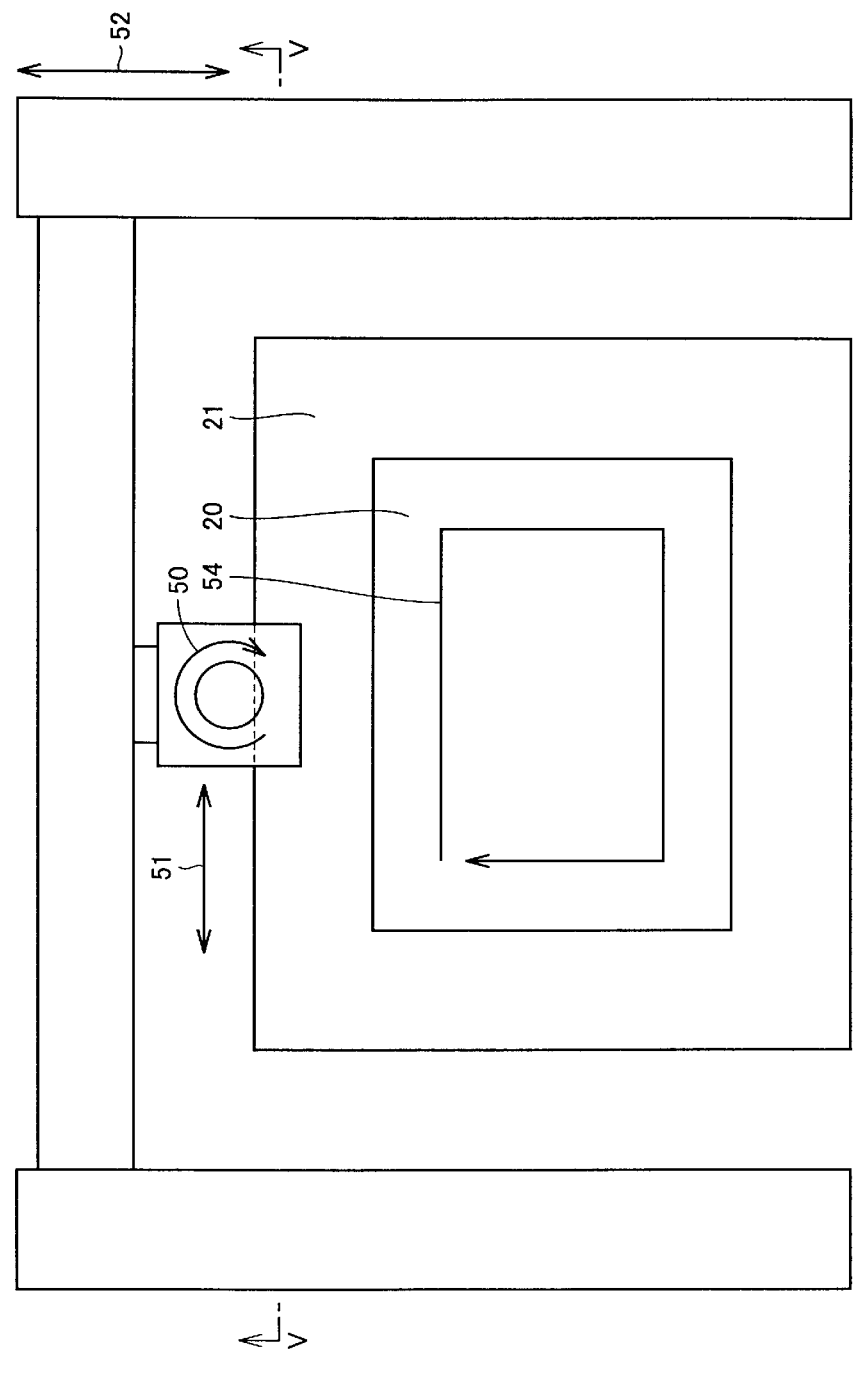
FIG. 4 is a plan view schematically showing the structure of the liquid crystal panel cleaning apparatus according to one embodiment of the present invention.
Figure 5:
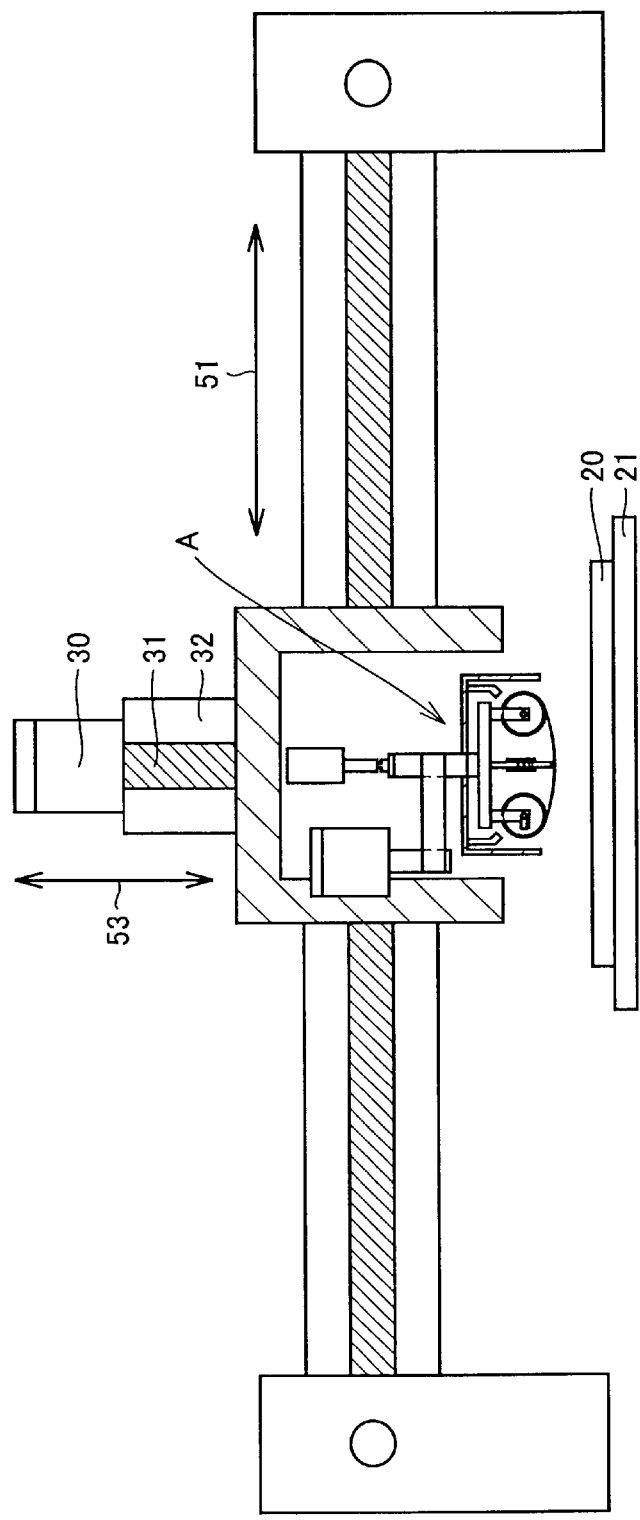
FIG. 5 is a schematic cross sectional view taken along the line V—V of FIG. 4.

Referring to FIGS. 4 and 5, rotating unit A is made movable substantially vertically (i.e. in the Z axis direction 53) by a motor 30 and a ball screw 31 mounted to a frame 32. Rotating unit A also is movable by the motor and ball screw substantially horizontally (i.e., in the X axis direction 51 and the Y axis direction 52).

Next, an operation of cleaning a liquid crystal panel utilizing the cleaning apparatus of the present embodiment will be described.

Referring first to FIG. 1, shaft 5 that is connected to the driving shaft of motor 1 is rotated by belt 4 at a constant speed. With the rotation of shaft 5, sheet rolls 8, polishing sheet 9, sheet backup 12 and so on rotate in the direction indicated by arrow 50 (FIG. 4). Upon the start of the rotation, nozzle 7 starts sprinkling water. At that time, water-scattering preventing cover 6 prevents sprinkled water from scattering about.

Referring mainly to FIG. 5, rotating unit A rotating at a constant speed, is lowered in substantially vertically, i.e., in the direction 53, by the motor 30 and ball screw 31. This vertical movement of the rotating unit A stops when it arrives at a position substantially immediately prior to that where polishing sheet 9 would be brought into contact with a liquid crystal panel 20 set on stage 21.

Referring mainly to FIG. 1, cylinder 2 lowers rotation shaft 5 via load cell 3, whereby polishing sheet 9 of rotating unit A that is in the rotating operation, is pressed against liquid crystal panel 20 with appropriate pressure.

With polishing sheet 9 being in contact with the surface of liquid crystal panel 20 with appropriate pressure, rotating unit A moves in the X axis direction 51 and Y axis direction 52 to leave a cleaning trace 54 (FIG. 4) over liquid crystal panel 20. In this way, the entire surface is cleaned.

Referring mainly to FIG. 5, after cleaning, motor 30 and ball screw 31 elevate rotating unit A in the vertical direction 53, and water sprinkling and rotation of the rotating unit A stop. Rotating unit A returns to its original position.

By repeating this operation, several liquid crystal panels 20 are automatically cleaned.

Note that in the operation of automatically feeding sheet, first of all, projection 14a is elevated by cylinder 15, brought into contact with projection 14, and directly elevates projection 14, e.g., by several millimeters, as shown in FIG. 3. The elevation of projection 14 causes rotation of sheet roll 8 which is fixed to projection 14, whereby polishing sheet 9 is rolled up by a prescribed amount. This ensures that a new portion of polishing sheet 9 is always used for cleaning.

Next, the quality, specification, and cleaning conditions of the polishing sheet according to the present embodiment will be described.

In the present embodiment, polishing sheet 9 may be, for example, a base material of Tetron taffeta polyester which is coated with 7 μm of abrasive white alumina particles through an adhesive of a polyurethane-based synthetic resin.

An abrasive may be applied to the fed sheet during operation of the apparatus for cleaning.

In the above described cleaning operation, rotation control of motor 1 maintains the rotation speed of rotating unit A, e.g., at 400–500 rpm, during cleaning operation of liquid crystal panel 20. A contact surface pressure (a pressure applied to liquid crystal panel 20) of polishing sheet 9 with respect to liquid crystal panel 20 is controllably maintained, e.g., at 0.1–0.2MPa to enable stable cleaning.

The material of polishing sheet 9 and conditions for the cleaning operation are appropriately selected for cleaning liquid crystal panel 20 such that at least 99% of cullets or foreign matters adhering to the surface of liquid crystal panel 20 can be removed. Thus, cleaning can be performed without affecting the quality of liquid crystal panel 20, for example, without causing polishing unevenness.

In the present embodiment, rotating unit A is automatically rotated to clean the surface of liquid crystal panel 20. Thus, unlike the conventional manual cleaning, efficiency and stability of the removal operation can be enhanced with reduced loss time and operation time, whereby foreign matters can be reliably removed.

In addition, a pair of rolls 8 enable automatic feeding of polishing sheet 9. Thus, a new portion of polishing sheet 9 is always used for cleaning, and an operation loss associated with the feeding of polishing sheet 9 would not be caused.

Moreover, sheet backup 12 causes rotation of polishing sheet 9 in line contact with the surface of liquid crystal panel 20. Thus, foreign matters on the surface of liquid crystal panel 20 are caught and scraped off liquid crystal panel 20. As a result, foreign matters are prevented from being caught between polishing sheet 9 and liquid crystal panel 20.

As shown in FIG. 2, sheet backup 12 is rotatively supported by swing mechanism 10. Even if the surface of liquid crystal panel 20 is inclined, polishing sheet 9 can be rotated closely in contact with the substrate surface. Thus, stability is ensured during rotation, and polishing sheet 9 can be reliably brought into contact with liquid crystal panel 20, whereby the problems associated with the precision and undulation of the surface of liquid crystal panel 20 can be eliminated. Furthermore, cleaning efficiency is enhanced and foreign matters are prevented from being caught between liquid crystal panel 20 and polishing sheet 9, whereby drawing of the foreign matters, panel scratches, and re-adhesion of the foreign matters can be prevented.

Referring to FIG. 1, load cell 3 can control a pressure of polishing sheet 9 against liquid crystal panel 20. Thus, the pressure of polishing sheet 9 against liquid crystal panel 20 can be properly controlled, whereby cleaning effect is enhanced, cleaning capability is stabilized, and cell gap unevenness of liquid crystal panel 20 can be prevented.

Note that although the liquid crystal panel is used as a substrate in the above described embodiment, a panel for an EL (electroluminescence) display or plasma display, or a wafer may be used.

As in the foregoing, the substrate cleaning apparatus of the present invention allows the sheet to be automatically rotated by the rotating unit for cleaning the substrate surface. Thus, unlike the conventional manual cleaning, a loss time and operation time for removing foreign matters can be reduced, whereby the efficiency of the removal operation is enhanced and stabilized. Thus, the foreign matters can be reliably removed.

In addition, the roll can automatically feed the sheet. Thus, a new portion of sheet is always used for cleaning and the operation loss associated with sheet feeding would not be caused.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A substrate cleaning apparatus comprising:
   a sheet arrange to be in contact with a surface of said substrate;
   a roll wound with said sheet;
   a sheet supporting member including a portion in line contact with a surface of said sheet opposite to a surface of said sheet facing said substrate, wherein said sheet supporting member is rotatively supported to incline said portion of said sheet supporting member in line contact with said sheet, and
   a rotating unit for rotating said roll wound with said sheet with respect to said substrate.

2. The substrate cleaning apparatus according to claim 1, wherein said sheet is adapted to be in line contact with said substrate surface.

3. The substrate cleaning apparatus according to claim 1, wherein said rotating unit includes a rotation shaft, and said substrate cleaning apparatus further comprises pressure adjusting means for adjusting a pressure of said contact of said sheet with said surface of said substrate, said pressure adjusting means including a load cell and a cylinder connected to said rotation shaft, wherein said load cell measures the pressure pressing said sheet against said substrate, and said cylinder adjusts the pressure pressing said sheet against said substrate to a predetermined value in accordance with a measurement value obtained by said load cell.

4. The substrate cleaning apparatus according to claim 1, wherein said substrate is a liquid crystal panel.

* * * * *